Aug. 26, 1969 J. WYSOCKI 3,462,908
METHOD FOR ERECTING BUILDINGS
Filed Aug. 24, 1967 7 Sheets-Sheet 1
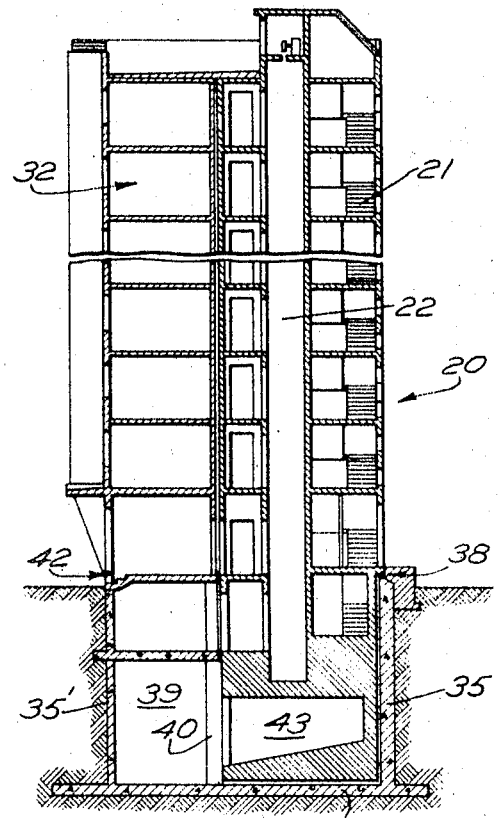
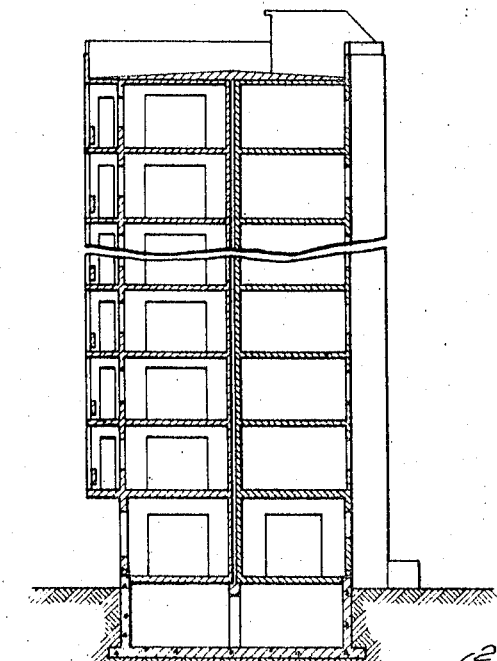
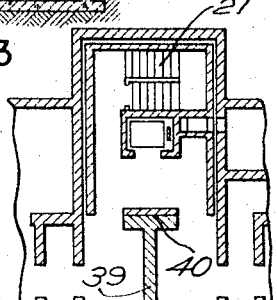
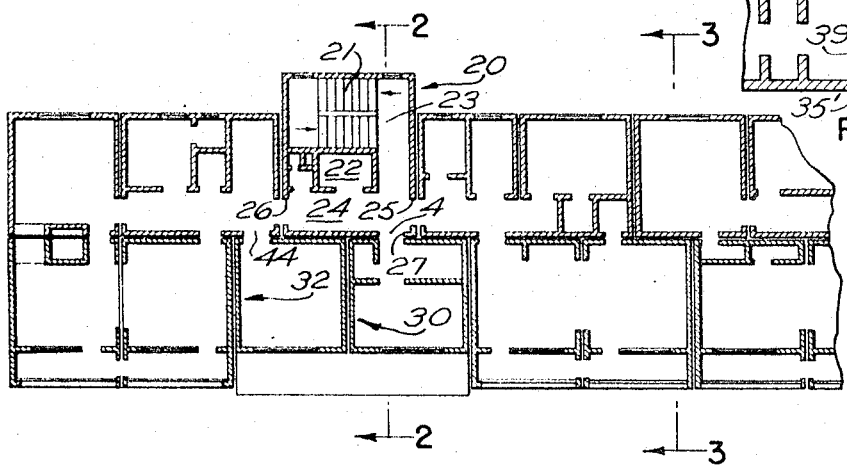
INVENTOR.
JERZY WYSOCKI
BY
Barlow & Barlow
ATTORNEYS

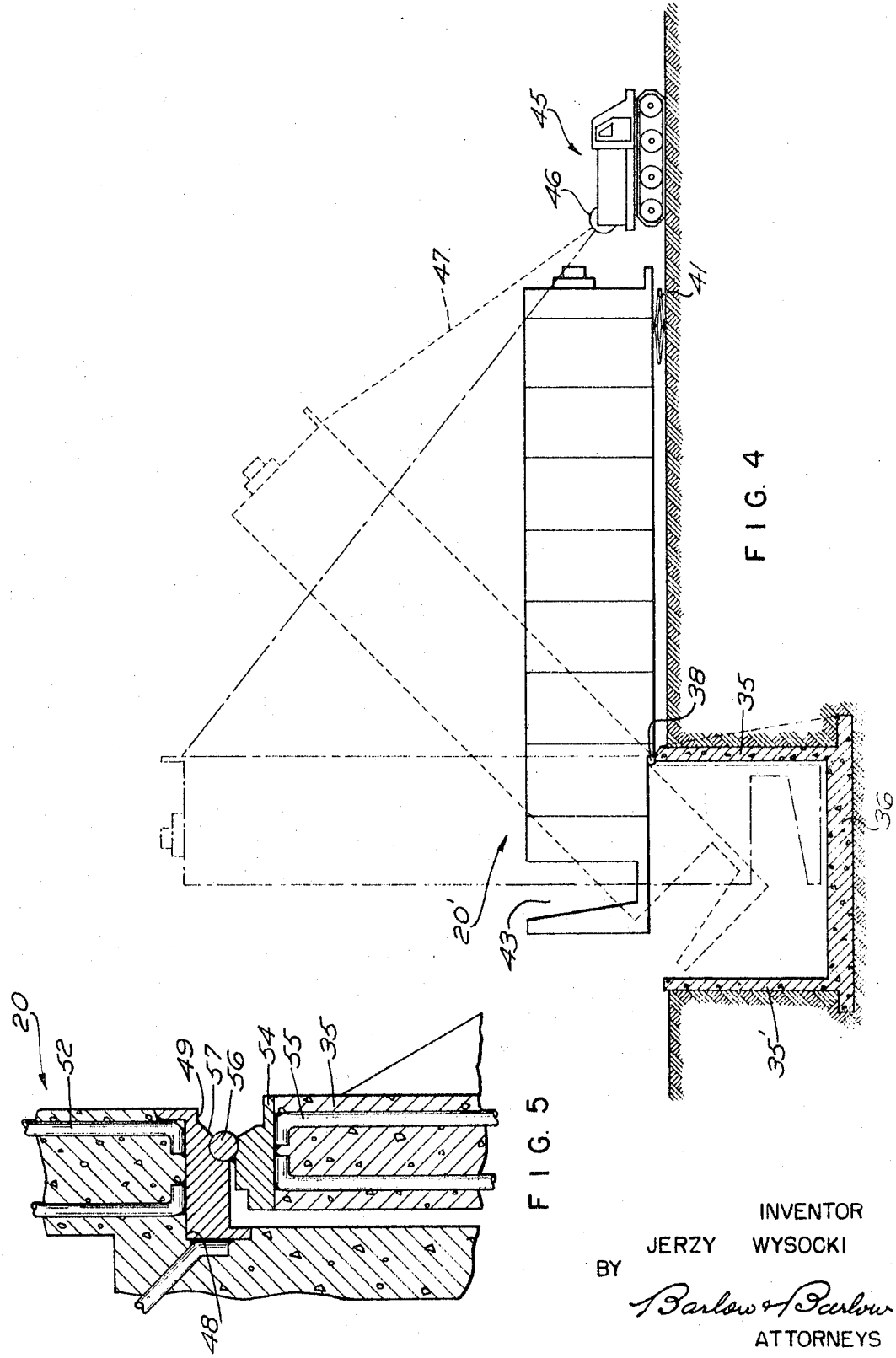

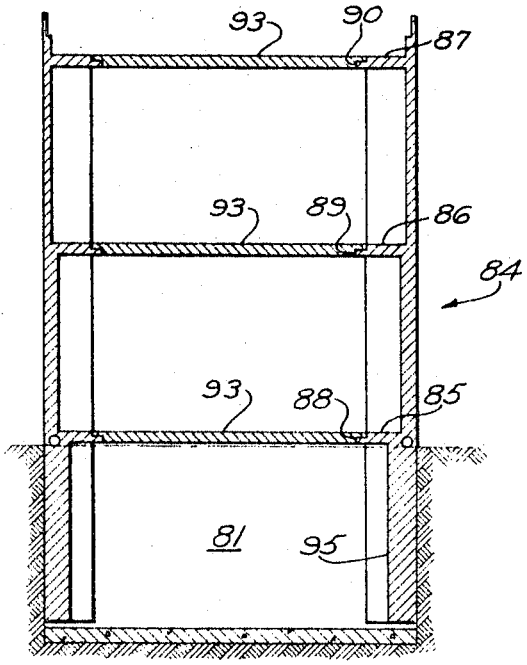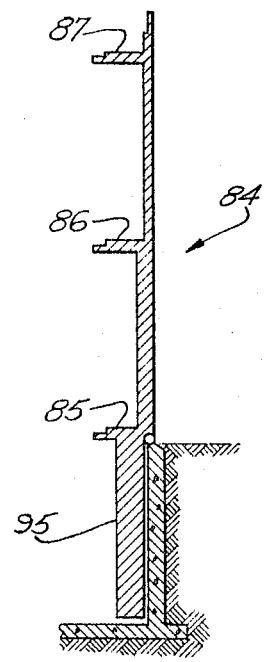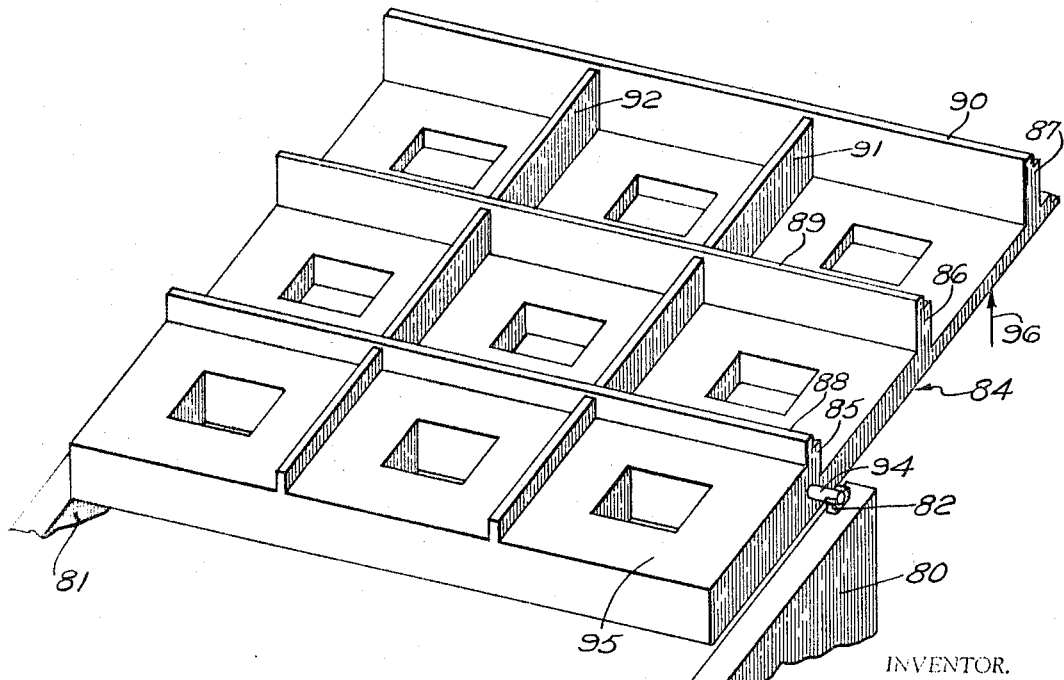

INVENTOR.
JERZY WYSOCKI
BY
Barlow & Barlow
ATTORNEYS

United States Patent Office 3,462,908
Patented Aug. 26, 1969

3,462,908
METHOD FOR ERECTING BUILDINGS
Jerzy Wysocki, 386 Benefit St.,
Providence, R.I. 02903
Filed Aug. 24, 1967, Ser. No. 662,974
Int. Cl. E04g *21/14;* E04h *1/00;* E04b *1/00*
U.S. Cl. 52—745                                     7 Claims

ABSTRACT OF THE DISCLOSURE

The method of erecting buildings where multi-story sections or units of a building are constructed or mounted in a horizontal position on the site and are then raised into vertical position by one or more means.

BACKGROUND OF THE INVENTION

It has been known, particularly in Europe, to pre-cast one-story sections of buildings in rectangular form, particularly where each section would represent a portion of a level of the building commonly known as a floor and then by the use of a crane or other hoisting device to hoist this, while maintaining it horizontal, into place and secure it into place much as one would erect a brick or other type of masonry wall. It has also been proposed to cast concrete one-story panels on the horizontal and to lift these panels while maintaining them horizontal into position after they have been sufficiently cured so that this may be accomplished. Heretofore, however, there has never been a complete building system in which a whole multi-story section or unit of a building could be cast or mounted in place in a horizontal position and then erected by hinging about a base to a vertical position by the use of counterbalance or mechanical force, and then from this singly erected unit lift means could be placed on top of the unit and additional sections could be hoisted into place without the need of any crane means as such. Basically, therefore, this invention envisions the erecting of a single towered means by the use of counterbalance and mechanical force and the adding of additional sections to form a completed building, which additional sections can either be erected through utilizing the same counterbalance system or by being hoisted into place from the top of the first erected tower or section.

SUMMARY OF THE INVENTION

A method of building in which multi-story sections of a building are poured into forms or mounted in a horizontal position on the building site and are then hinged into vertical position by the use of counterbalance or a mechanical force or a combination of the two.

DESCRIPTION OF THE DRAWINGS

FIG. 1 is a floor plan sectional view of a portion of a composite building that may be erected by utilizing the method of this invention;

FIG. 2 is a sectional view taken on lines 2—2 of FIG. 1 of a portion of the building completely erected;

FIG. 2A is a cellar section plan view of the area of FIG. 2;

FIG. 3 is a sectional view taken on lines 3—3 of FIG. 1;

FIG. 4 is a diagrammatic view illustrating the manner in which one of the sections may be erected by counterbalance;

FIG. 5 is a detailed sectional view on an enlarged scale illustrating one method of hinging a building unit;

FIG. 12 is an isometric view of a single wall unit which has been cast or mounted in horizontal position and which is ready for being erected in place;

FIG. 13 is a sectional view of two complemental structures of FIG. 12 in vertical position;

FIG. 14 is a sectional view of an alternate method of hinging the wall which is similar to the hinging utilized in FIG. 5;

DESCRIPTION OF THE PREFERRED EMBODIMENTS

Figure 7:
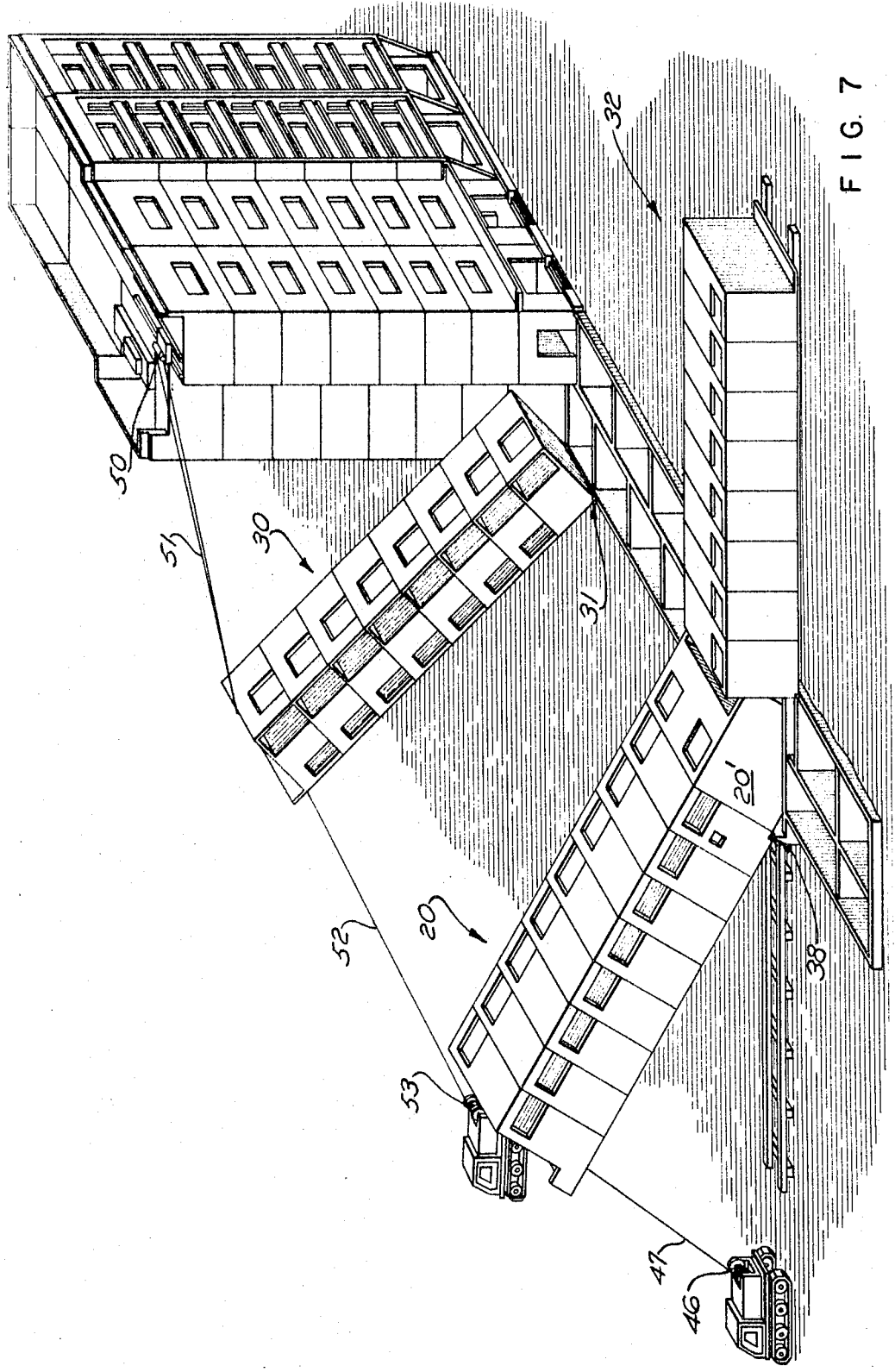
FIG. 7 is an isometric view of a large building structure which is diagrammatic and which illustrates in isometric form two towers being erected, one by counterbalance and one by lift means.
Figure 11:
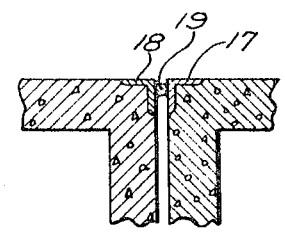
FIG. 11 is an enlarged detailed view of one method of fastening adjacent assembled towers together to form an integral unit.

Referring to FIG. 1, there is shown a part of a floor plan of a portion of a completed building that can be similar to that shown in FIG. 7. The initial structure is a tower or multi-story section or unit generally designated 20 which is conveniently provided above the ground floor level as herein shown with a staircase 21 (FIGS. 1 and 2) and an elevator enclosure or shaft 22. As will be seen, this section includes a landing area 23 which extends into a hallway area 24 and thus at each story or floor openings are provided at the end of the passageways 24 as at 25, 26 to gain access to the adjacent sections. Additionally, if the design dictates, an opening such as at 27 may be provided into another unit or tower section generally designated 30. The precise arrangement of the various units is, of course, open to alteration and is not a limiting factor on the concept of the method of building presented herein and is, therefore, only given by way of example. FIG. 2, however, does illustrated on section line 2—2 of FIG. 1 an assembled building structure in which the tower generally designated 20 is shown as being supported within foundation walls 35 and footings 36 by a hinge which is generally designated 38. The vertical position of the tower 20 is maintained by a T-shape transverse stress member 39 (FIG. 2A) that extends between the foundation wall 35' and an inner edge of the lower structure of the tower 20 as at 40. Similarly, another tower section which has been generally designated 32 is shown as being supported on a hinge 42 and maintained in its vertical condition by attachment to the tower 20, which attachment can be achieved in a number of ways. For example, where the two tower sections are in substantial abutting relationship as at door sills which would occur as at 44 for example on FIG. 1, the door sill sections may be provided with suitably embedded angle irons which have been embedded in the concrete or other building material in manners well known to those skilled in the art. For example, if the angle iron is embedded in concrete, it will be embedded by the use of integrally attached reinforcing rods, and in this case the adjacent angle iron portions may be welded together in the manner as shown in FIG. 11. Here, for example, there is illustrated two angle irons which are designated 17 and 18 on adjacent sections, and a rod-like member 19 is inserted between these angle irons and welded into position as illustrated. This, therefore, forms one type of interconnection that can be achieved. There are numerous other types of interconnections that can be utilized by embedding angle irons or other steel members at other positions in the structure where two towers substantially abut. It should, of course, be pointed out that the towers do not in fact come into contact one with the other as the system is designed to leave a small distance between the towers for tolerance, which distance would be on the order of 1 to 2 inches which may be filled with insulation or with material to make a solid wall.

Reference should now be made to FIG. 4 which shows a tower section 20 that for convenience of illustration has been shown as comprising only six stories. It is understood that any number of stories can be utilized. The Tower section generally designated at 20 is cast or mounted in a horizontal position possibly on the ground, and the entire structure is permitted to cure for the requisite number of days depending upon the type of concrete that is used if it be concrete, or if it be some other material, then no waiting period may be necessary. The tower 20 is basically made up of two sections, there being an upper floor section above the hinge 38 and a lower floor section below the hinge 38 which is shown as extending over the foundation walls 35, 35'. The lower section which I have generally designated 20' is what is termed the counterbalance section depending upon a variety of factors may be made with a receptacle or recess such as 43 (FIG. 4) where a live load may be added to achieve the proper balancing effect. The tower itself is properly designed so that it will be structurally an integral piece and one which will withstand bending moments, particularly bending moments about the hinge 38. Through design the static weight of the tower 20 on either side of the hinge point or pivot 38 may be readily ascertained. If, for example, the static weight to the right as viewed in FIG. 4 is greater than the static weight on the left, then the container section 43 can be filled with the requisite amount of gravel, water or other material to achieve a balance between the two sections about the hinge 38. Assuming that balance is achieved or is nearly achieved, the tower 20 may first be partially raised through the use of jacking means 41 slightly above the horizontal position as illustrated in FIG. 4. At this point the moments operating about the hinge 38 will change, and if the balance is close, the tower will now attempt to erect itself since the force from the center of gravity of the counterbalance section 20' is now acting in a different direction and will overcome any resultant force from the upper section of the tower 20. In this case the tower will desire to erect itself by its own counterbalance, and it will be necessary to utilize a restraining means such as a restraining cable that is shown in broken line attached to a controllable reel device that we have generally designated 45, which device contains a reel 46 that has a cable wound thereon and which is attached to the top of the tower by suitable means. In the dotted lines the tower is shown as partially erected by jack 41 and by its own counterbalance force which at a certain point will be restrained by the cable 47 from the drum 46. The drum is slowly payed out until the tower is fully erected into the position of broken lines, at which point it will be a stable tower. However, the tower is subject to being rotated by wind forces and other phenomena clockwise as viewed in FIG. 4. Accordingly, as noted in FIGS. 2 and 2A, a restraining structural member 39 is put into place to prevent the tower from such movement once it has reached a vertical position.

The hinge 38 can take a variety of forms, one possible form being illustrated in FIG. 5. Here the tower 20 is provided with a setback 48 in which setback an angle structure 49 may be suitably secured in concrete, for example, by reinforcing rods 52. On the upper section of the foundation 35, plate means 54 are suitably secured again as by reinforcing rods 55, and to this plate means 54 a hinge rod 56 may be secured such as by welding while the angle structure 49 has a complemental arched hinge formation 57 formed therein. It is to be understood, of course, that other designs of hinges will work equally well, the only criteria being that the hinge pieces be anchored sufficiently to withstand the horizontal forces as compressive forces are easily absorbed by small section hinge pins.

Figure 6:
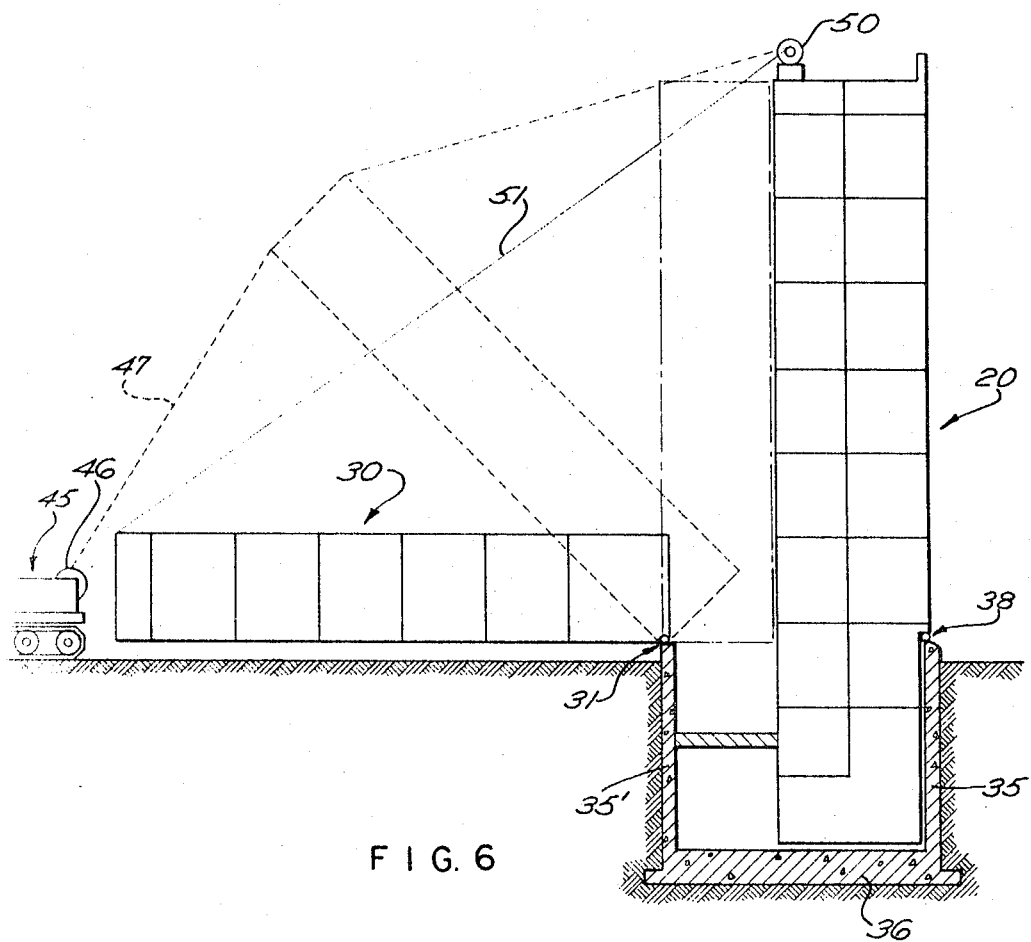
FIG. 6 is an elevational view largely diagrammatic showing the manner of erecting the abutting tower to the tower shown in FIG. 4.

After the tower 20 is erected, it will be noted particularly by referring to FIGS. 1 and 2 that this tower is preferably designed with great flexibility by having stairs 21 cast in place therein as well as being provided with a lift shaft 22 into which a lift may be placed while the tower is conveniently in a horizontal position. This gives complete access to the various levels of the tower, and to add to the structure on the other foundation wall 35', there may be hingedly attached another section such as the section designated generally 30 (FIG. 6). As in the case of the tower 20, the section 30 is arranged with a suitable number of floors or stories, and after the complete structure as is desired by the design has been cast in place or mounted in a substantially horizontal position, there is attached to the roof of the tower 20 a winch drum 50 which has a cable wound thereabout which cable 51 extends down to the top of the tower section 30. The tower section 30 is hinged to the foundation 35 by a hinge generally designated 31 (FIG. 6) which hinge may take a form similar to that shown in FIG. 5 or an equivalent form which will withstand the necessary forces that are attendant to erecting a tower structure from a horizontal to a vertical position. The winch drum 50 is suitably powered and slowly pulls the tower 30 into fully vertical position through the positions as shown in dotted line to the position shown in broken line which is the final resting position.

As alluded to above, the two tower sections 20 and 30 may now be joined in a variety of ways, for example, at door sills by utilizing a method similar to that shown in FIG. 11 or by the other alternate means that have been previously mentioned.

Reference should now be made to FIG. 7 where there is illustrated a possible method of erecting a number of units similar to the towers 20 and 30 and 32 to form a completed structure. For example, in the lower portion of FIG. 7, there is shown a tower 20 which is in partially erected position being restrained by a cable such as 47, the counterbalance section 20' being permitted to hinge into the foundation at the same time another section generally designated 32 is lying on suitable supports on the ground awaiting the full erection of the section 20 before it too can be raised into position. Intermediate the ends of the building of FIG. 7 there is shown being lifted into place a tower section such as a section 30 which is being lifted by a cable 51 from a winch drum 50 mounted on top of an existing tower that is in fully erected position. A restraining cable 52 extends from the top of tower 30 to a swinch 53 on the ground.

Figure 8:
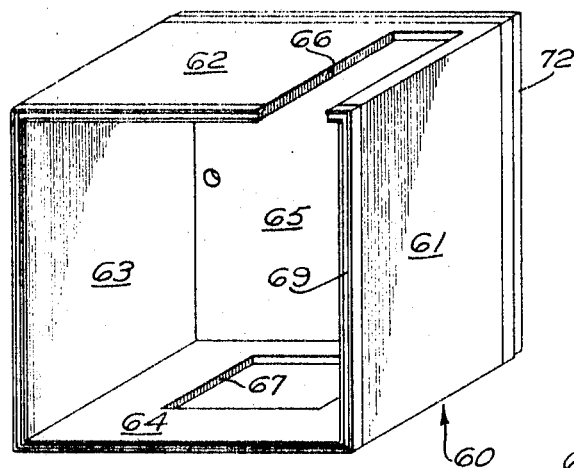
FIG. 8 is an isometric view of a section or unit of a pre-cast room.
Figure 10:
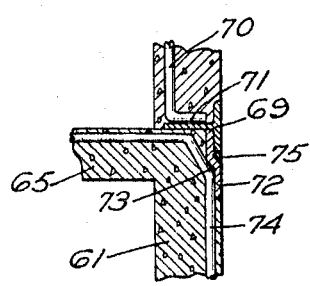
FIG. 10 is an enlarged cross-sectional detailed view of one method of fastening the elements of FIG. 8 together into the form of FIG. 9.
Figure 9:
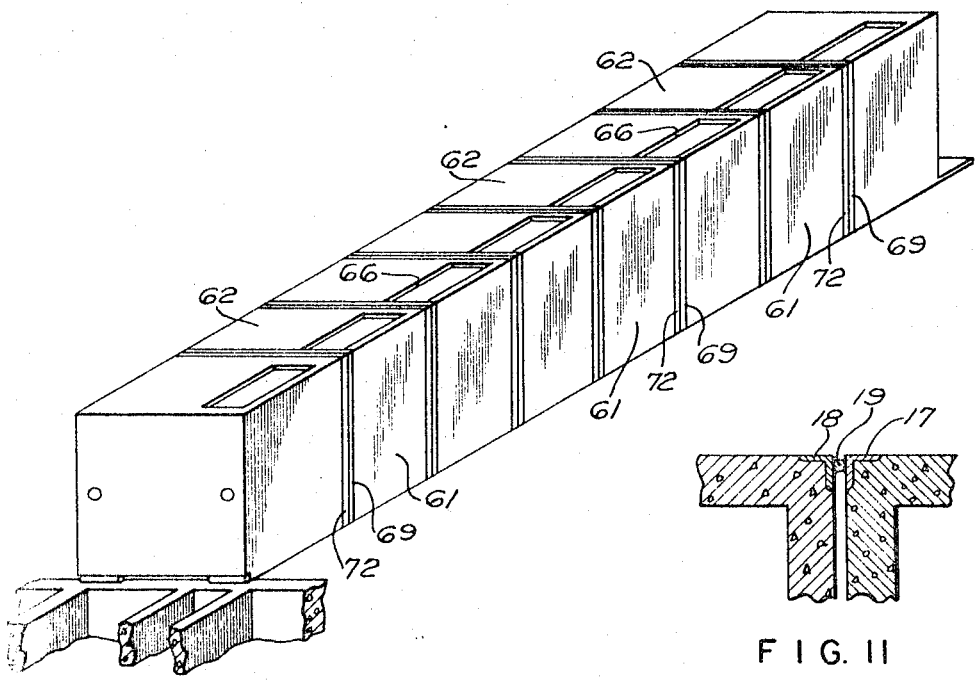
FIG. 9 is a perspective view with a number of the pre-cast rooms fastened together into a tower structure ready for being lifted into position.

Referring now to FIGS. 8–11, there is shown another manner in which a tower can be fabricated. For example, it has become quite popular to precast sections of buildings as, for example, a section such as shown in FIG. 8. As mentioned above, when this has been done in the past, the floor sections that have been so pre-cast have been erected into place by a lifting crane. Heretofore, it has never been suggested that such sections could be placed in end to end relationship on a horizontal surface such as the ground, fastened together and then lifted into place such as has been explained above in connection with the tower sections 30 and 32, for example. To this end, therefore, there has been illustrated in simple form a room section generally designated 60 which has four walls 61, 62, 63 and 64 and a roof section 65. The wall section 62 may be provided with a doorway 66, while the wall section 64 may be provided with a window opening 67. In order to fasten a room section such as this to another room section, it is necessary to provide some means which would be integral with the room section to achieve this fastening. If the room section is to be pre-cast out of concrete, for example, it is necessary along the lower junction of the walls 61, 62, 63 and 64 to embed iron members such as a T-iron 69 or other shape as shown more particularly in FIG. 10. This T-iron section would be suitably secured to the concrete by the use of a reinforcing rod or rods such as 70 that would be welded thereto as at 71, thus making it an integral part of the structure. To cooperate in stacked relationship with a room of identical configuration around the periphery of the roof section 65, it is necessary to provide an offset plate such as 72 as shown more particularly in FIG. 10, which offset plate is welded as at 73 to a reinforcing rod 74 embedded in the wall such as 61 and in the roof 65. Similar sections may be fastened together into a form as illustrated in FIG. 9 by welding the iron sections 69 and 72 together as at 75, and in this fashion a complete tower structure can be readily assembled on the ground and then erected into place.

It will be appreciated that this building method can be utilized in smaller structures than that illustrated in the previous figures, and to this end there is shown in FIG. 12 a single bearing element which in this case is a wall of a two-story building which could conceivable be a small dwelling. A base here shown as foundation walls 80 and 81 is provided in spaced relationship, and on the foundation walls a bearing means such as 82 is affixed, the bearing means 82 consisting of a casting, for example, which is secured to the upper surface of the foundation walls 80 and 81 by integrally attached reinforcing rods that extend into the foundation. Cast horizontally on the ground adjacent the foundation is a wall designated generally 84 of a building, which wall has extending therefrom floor and roof sections 85, 86 and 87, each provided with a lip 88, 89 and 90. Similarly, vertical dividers such as 91 and 92 are provided between the floor and roof sections 85, 86 and 87, and a hinge pin 94 extends from the wall 84 at a location adjacent the first story level 85. The cellar section of the wall 84 as at 95 is made thicker than the upper wall section so that a counterbalance is achieved as in the tower section 20 described above, and by suitable design this wall section may be erected by exerting an upward force on the upper wall section as, for example, as at the arrow 96. In this way the wall will be erected into vertical position such as shown in FIG. 13 by the influence of the counterbalance or mechanical force or both. When two opposite wall sections such as illustrated in FIG. 12 are erected in spaced relationship to each other as in FIG. 13, it is possible then to place a pre-cast slab 93 on the lips 88, 89 and 90 of the floor and roof sections so that a completed structure can be achieved with two open ends which almost at the same time can be completed in a similar way.

Two methods of pivoting such wall sections are shown in FIGS. 13 and 14, the drawing of FIG. 14 illustrating a wall section pivoted in the same fashion as the tower 20.

Figure 15:
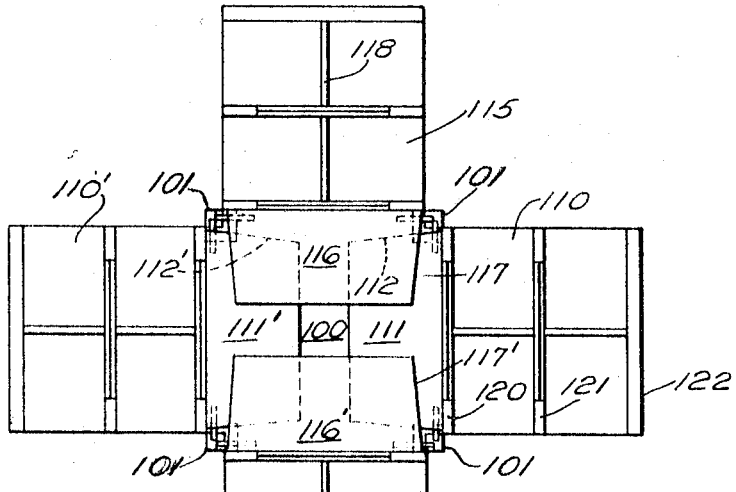
FIG. 15 is a top plan view of a modified form of wall construction.
Figure 16:
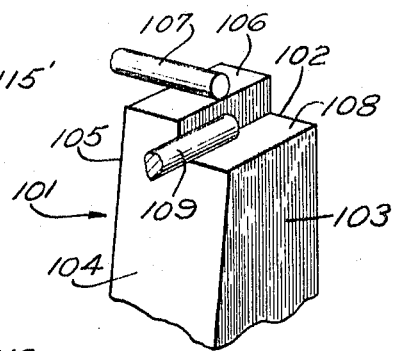
FIG. 16 is a perspective view of one of the columns used in the excavated or cellar area of the showing in FIG. 15.
Figure 17:
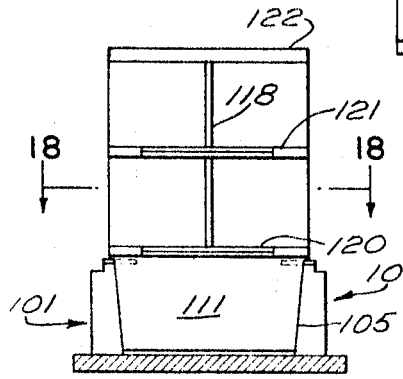
FIG. 17 is an elevational view of one of the walls looking from the inside thereof and showing the cellar arrangement.
Figure 18:
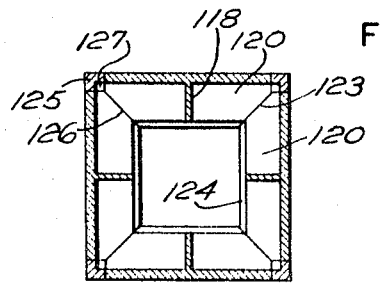
FIG. 18 is a section at line 18—18 of FIG. 17 with all four walls in position.

FIG. 15 illustrates a somewhat modified form of showing of the walls such as shown in FIGS. 12, 13 and 14. In this figure the excavated area into which the cellar portion of the walls are to extend is designated 100 and is generally rectangular in a horizontal plane. At each one of the corners of this excavation, there will be a column which is designed 101 and is shown at its upper end in FIG. 16 where there is shown vertical surfaces 102 and 103 to fit the vertical corner wall of the excavation with tapered or inclined surfaces 104 and 105 providing a column larger at the bottom than at the top. Also the upper end of this column has two levels, an upper level 106 upon which there is a pivot or hinge pin 107 and a lower level 108 supporting a pivot or hinge pin 109. Similar columns are in each of the four corners of the excavation. Supported on the pins 109 of two columns of the lower level, there are the walls 110 and 110' having upper stories above the ground and cellar counterbalancing portions 111 and 111' to extend into the cellar area. These counterbalancing portions 111 and 111' are tapered as at 112 and 112' in an amount similar to the taper of the columns so that when in a vertical position they will fit between the columns at the two corners of the excavation into which the section is to be pivoted to its vertical position. Superimposed or on the upper level 106 and pivoted on the pins 107 are the side walls 115 and 115' which have the cellar counterbalancing portions 116 and 116' also provided with tapered portions 117 and 117' so as to fit the corresponding taper on the columns when swung between them. Each wall has a part of a partition 118 acting as a stiffening rib. Each of these wall sections are provided with floor lips such as 120 and 121 and roof lips 122. However, these sections will have their edges beveled as at 123 (see FIG. 18) so as to fit with corresponding floor sections extending from the walls at right angles thereto. Lips 124 may be provided on each one of these floor sections for supporting slabs to complete the floor of the building. The counterbalancing sections of the walls may be thickened to an amount similar to the columns and may be held in place by some sort of a cellar floor if desired. At the junction of the walls, closure material such as concrete may be provided as at 125. Also the seams at 126 or opening 127 may be filled.

Figure 19:
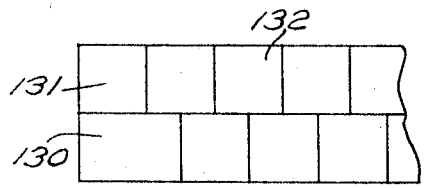
FIG. 19 is a diagrammatic view showing some modification from the arrangement of the other figures.

In some cases instead of having the sections or units directly opposite each other, they may be of different sizes in one row than in another. Thus, in FIG. 19 at 130 there are units or sections which are of a length greater than adjoining sections 131 and 132 so that the joint between the units or sections are staggered as shown in the plan diagrammatic view in FIG. 19.

It will also be noted that the basement section such as of the tower in FIG. 1 is of a depth greater than the building sections which are adjacent thereto such that they may be two stories deep only where the stairs are provided and one story deep in other portions of the building.

In each case a bearing element which may be one or more walls, column, pillar, slab, beam, or cable is hinged about some base, which may be a foundation, wall, column or existing part of the building, into vertical position and then fastened in this position.

The bearing element may be made of steel, concrete, wood or other suitable material.

I claim:
1. The method of erecting a multi-story building comprising forming in a generally horizontal position a to-be-vertical section of the building, providing a hinge on the section located intermediate the ends of the section so that a portion of the section acts as a counterweight to offset the weight of another portion, securing the hinge to a base and swinging the section about the hinge assisted by the counterweight to move the section from the generally horizontal position to a vertical position and securing the section in vertical position.

2. The method of claim 1 wherein a removable load is added to the portion of the section acting as a counterweight.

3. The method of claim 1 wherein the erecting is by means of both counterbalance and mechanical force.

4. The method of erecting a multi-story building which comprises forming a unit in horizontal position having walls and multiple floors, providing a base, hinging the unit to the base at a location intermediate the ends of the unit giving rise to a counterbalancing effect of a portion of said unit, swinging the unit about the hinge to vertical position, providing a second multi-story unit in horizontal position with walls and multiple floors, providing at the end of the second unit a hinge connection of said second unit to a base and providing raising means on the erected first unit and using said raising means to raise the second unit to vertical position.

5. The method of erecting a multi-story building as in claim 4 wherein the raising means are positioned on the first unit before swinging the first unit into vertical position.

6. The method of claim 5 wherein a removable load is added to the portion of the building unit acting as a counterweight.

7. The method of claim 5 wherein the swinging of the first said building unit is by combined means of counterbalance and mechanical force.

References Cited

UNITED STATES PATENTS

| | | | |
|---|---|---|---|
| 2,852,931 | 9/1958 | Bonet | 52—745 |
| 2,871,544 | 2/1959 | Youtz | 52—745 |
| 3,300,943 | 1/1967 | Owens | 52—745 |
| 3,328,859 | 7/1967 | Stevens | 52—745 |

FOREIGN PATENTS 614,670    9/1926    France.

FRANK L. ABBOTT, Primary Examiner

P. C. FAW, Jr., Assistant Examiner

U.S. Cl. X.R.

52—79, 122, 236